United States Patent [19]

Priegnitz

[11] 4,209,826
[45] Jun. 24, 1980

[54] REGULATED SWITCHING MODE POWER SUPPLY

[75] Inventor: Robert A. Priegnitz, Algonquin, Ill.

[73] Assignee: Coilcraft, Inc., Cary, Ill.

[21] Appl. No.: 915,378

[22] Filed: Jun. 14, 1978

[51] Int. Cl.² .......................................... H02M 3/335
[52] U.S. Cl. .................................. 363/21; 323/DIG. 1
[58] Field of Search ............. 323/DIG. 1; 363/18–21

[56] References Cited

U.S. PATENT DOCUMENTS

| | | | |
|---|---|---|---|
| 3,331,012 | 7/1967 | Aiken | 323/21 |
| 3,440,520 | 4/1969 | Jones et al. | 323/6 |
| 3,483,428 | 12/1969 | LaPlante | 315/151 |
| 3,504,263 | 3/1970 | Schaefer | 363/19 |
| 3,564,393 | 2/1971 | Williamson | 323/17 |
| 3,599,082 | 8/1971 | Besler | 323/21 |
| 3,740,640 | 6/1973 | Ravas et al. | 323/17 |
| 4,007,425 | 2/1977 | Salisbury | 328/3 |
| 4,020,408 | 4/1977 | Grant | 363/21 |
| 4,037,271 | 7/1977 | Keller | 363/21 |
| 4,135,233 | 1/1979 | Seiersen | 363/21 |

OTHER PUBLICATIONS

"Low Cost 100W Off-Line Isolated Switching-Mode Power Supply", *Texas Instruments Application Report No. B174*, pp. 1–9.

*Primary Examiner*—William M. Shoop
*Attorney, Agent, or Firm*—McCaleb, Lucas & Brugman

[57] ABSTRACT

A switching mode power supply characterized by an output in the forward conversion mode and a separate output in the flyback mode whereby a device having variable power requirements in one aspect of its operation, and a stable power requirement another aspect of its operation may be powered without interference as between the two sources of power. The flyback power output is monitored for voltage regulation, regulation being achieved by a constant-off-time variable-on-time switch. The power supply likewise includes novel protective circuitry to shut it down in the event of excessive voltage or current therein.

15 Claims, 5 Drawing Figures

REGULATED SWITCHING MODE POWER SUPPLY

BACKGROUND OF THE INVENTION

This invention had its inception as a power supply for a pinball machine. Such machines have a variety of power requirements. There are a wide variety of totalling functions to be performed, such as keeping score, counting the balls, doubling or otherwise multiplying score counts, changing ball counts with the score, etc., which are best performed by a microprocessor. In such an application, the microprocessor is a steady, low-level power consumer, demanding tight voltage regulation and isolation fron transients. Pinball machines also have a multitude of lights and solenoids which demand randomly and suddenly rather substantial power output and which are productive of strong transients. Tight voltage regulation is not imperative, but the power supply must be flexible enough and potentially powerful enough to meet the widely changing demands of these components.

Although this circuit has been devised with a pinball machine in mind, it will be appreciated that it is applicable to any situation where clean isolation between power outputs is demanded and where one of those outputs must be tightly regulated.

Switching mode power supplies are generally not new. Their advantages in terms of size and cost and efficiency of operation have been recognized and appreciated. Attention is directed to U.S. Pat. Nos. 3,740,640 to Ravis et al. dated June 19, 1973, and 3,564,393 to Williamson dated Feb. 16, 1971, and to Application Report No. B174, "Low Cost 100W Off Line Automated Switching Mode Power Supply" of the Texas Instrument Company (undated). This publication and these patents show switching mode power supplies which, however, differ from the present circuit in the specific aspects discussed.

SUMMARY OF THE INVENTION

In the present circuit, line current is rectified and filtered and delivered to the primary of a power transformer. A transistor switch is connected in series with the primary which is controlled by an oscillator to establish an on-off cycle of about 20 kHz. The frequency will vary with the correction imposed on the oscillator by voltage-regulating feedback from the secondary of the transformer.

The secondary of the transformer has a forward conversion winding and a flyback winding. The forward conversion winding is characterized by the presence of a diode in the secondary circuit which permits current flow in the secondary attendant upon current in the primary or when the switch is on, and blocks current flow in the opposite direction through the secondary upon a collapse of the flux field in the transformer core when the switch is turned off. The flyback winding has an oppositely oriented diode; that is, current flows in the secondary winding only when energy stored in the transformer core discharges or when the current through the primary is turned off.

These two power outputs are not only isolated effectively from each other; they are also well calculated to serve their specific purposes.

It will be appreciated first that both outputs are DC pulse trains which are easily filtered to obtain a steady state DC for operating the solenoids and lights on the one hand and for operating the microprocessor on the other.

The forward conversion mode as applied to the lamp and solenoid function has a highly flexible output essentially uninhibited by the transformer core dimensions. That is, the load in the forward transfer secondary draws a current during the time a current exists in the primary dependent on the current demand of that load, and substantially independent of core characteristics. At the same time, energy is stored in the core in the form of flux.

When the switch is turned off, the flux in the core generates an opposite current in the secondary. Because of the reversal of current, the forward transfer winding is no longer conductive and disappears as a load on the transformer. The flyback winding, however, is conductive and a direct current pulse train, filtered, is applied to the microprocessor. The power in the flyback mode is directly dependent on the energy stored in the core, and thus is relatively limited, but free from transients and relatively stable.

A second feature of importance attributable to this arrangement is that the transformer may be small and inexpensive. Since the big power consumer, the forward transfer circuit and its associated loads, is conductive only when a current appears in the primary, it is not dependent on energy storage within the core of the transformer. The power required to operate the microprocessor is small, and a small core structure is sufficient to store the energy it requires.

Another feature of this invention lies in the shutdown latch. Very close regulation is obtained by directly monitoring the secondary flyback circuit. Shutdown is achieved by feeding a disabling signal to the oscillator which governs the turn-on and turn-off of primary current. This invention contemplates the novel use of an optical coupler wherby over-voltage conditions in the secondary, as well as over-current conditions in the primary can be detected and employed to disable the circuit while at the same time maintaining complete isolation of the secondary from the primary circuit.

A further advantage of this invention lies in the general circuitry whereby high power, tight regulation, and efficient output can be obtained compactly and inexpensively.

Other objects and advantages of this invention will be apparent from the following description and drawings.

DESCRIPTION OF A PREFERRED EMBODIMENT

A. Main Power Supply and Power Stage

Figure 1A:
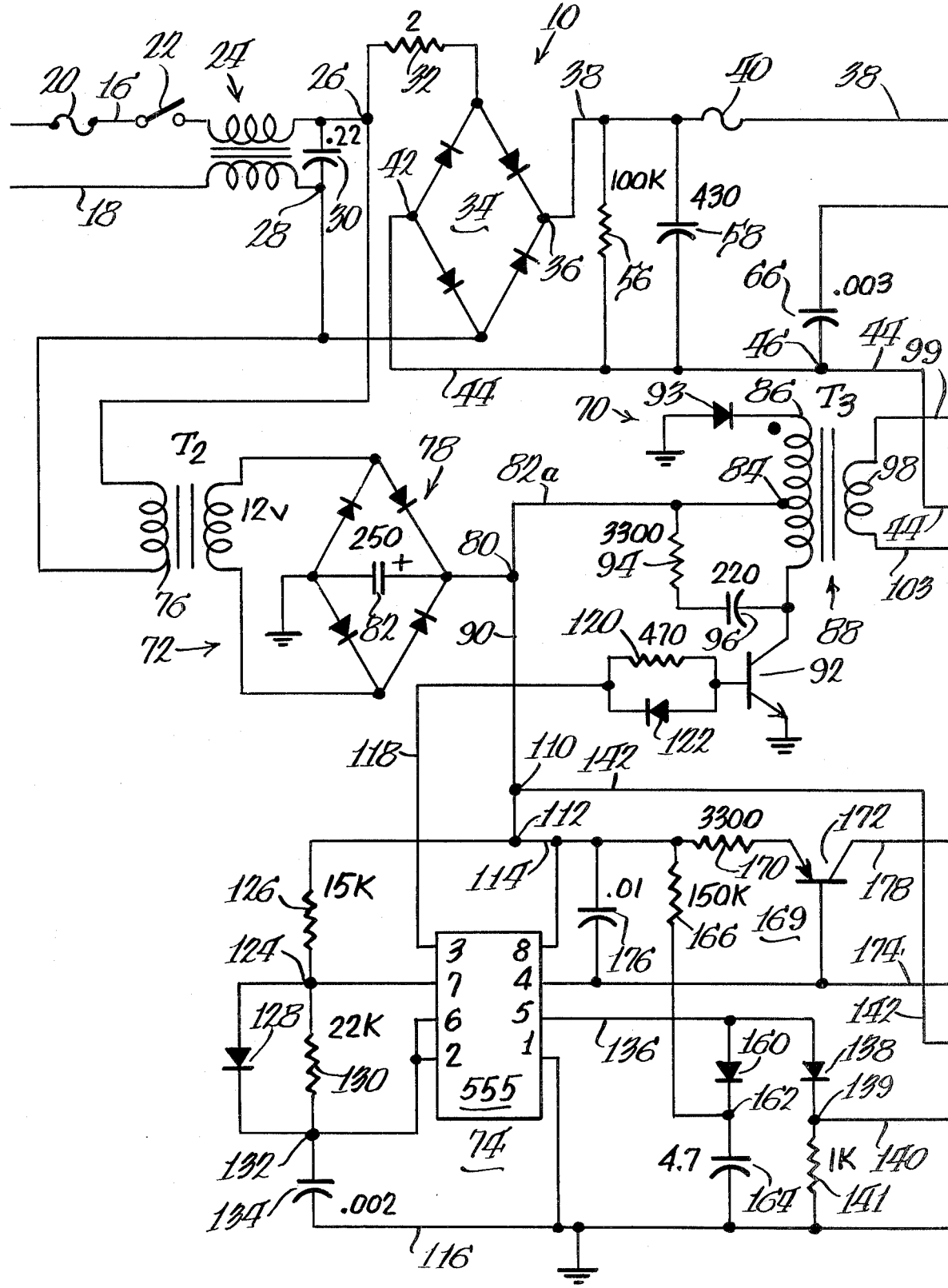
FIG. 1 is a circuit diagram of the circuit of the present invention.
Figure 1B:
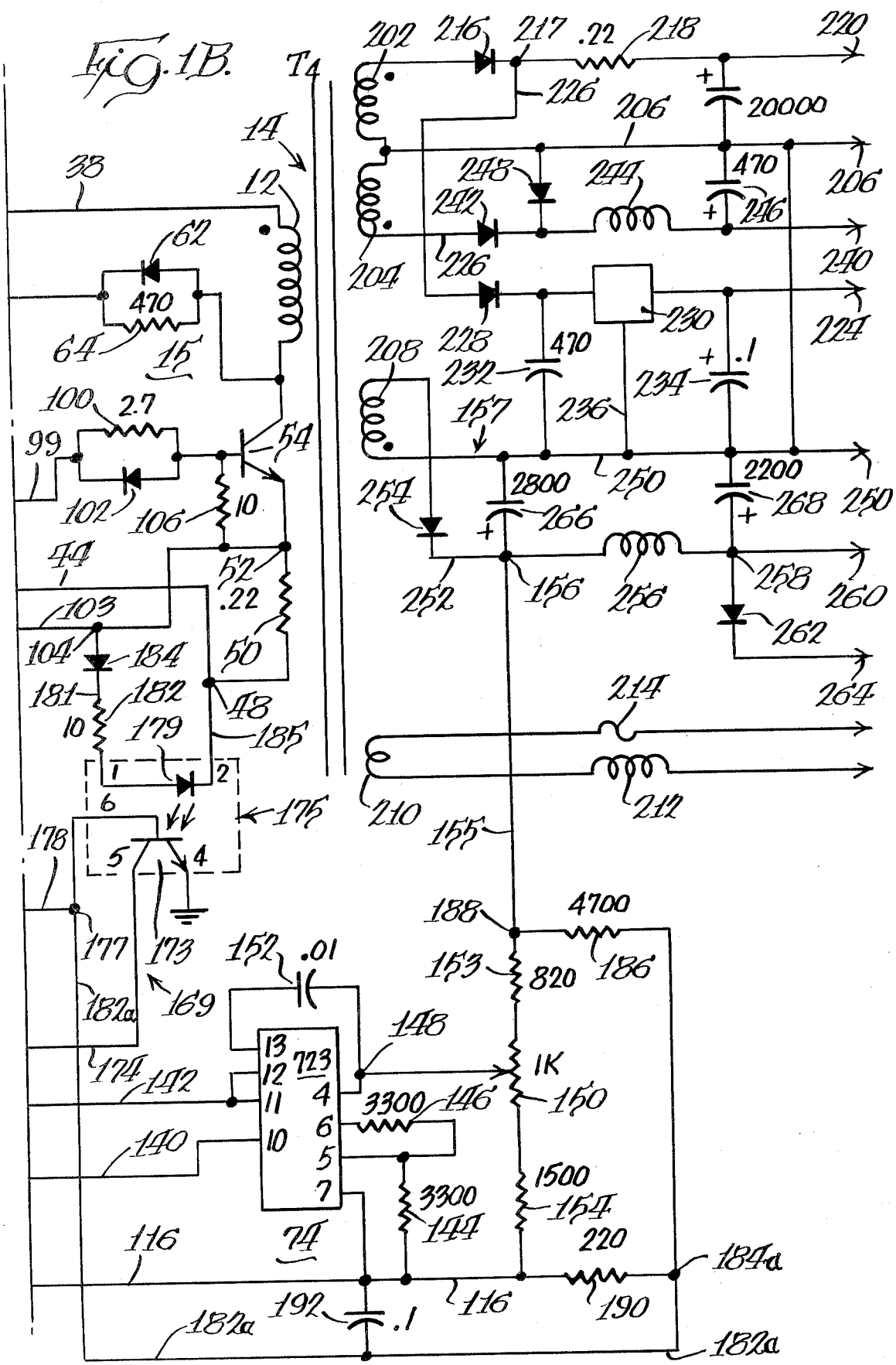
Figure 2:
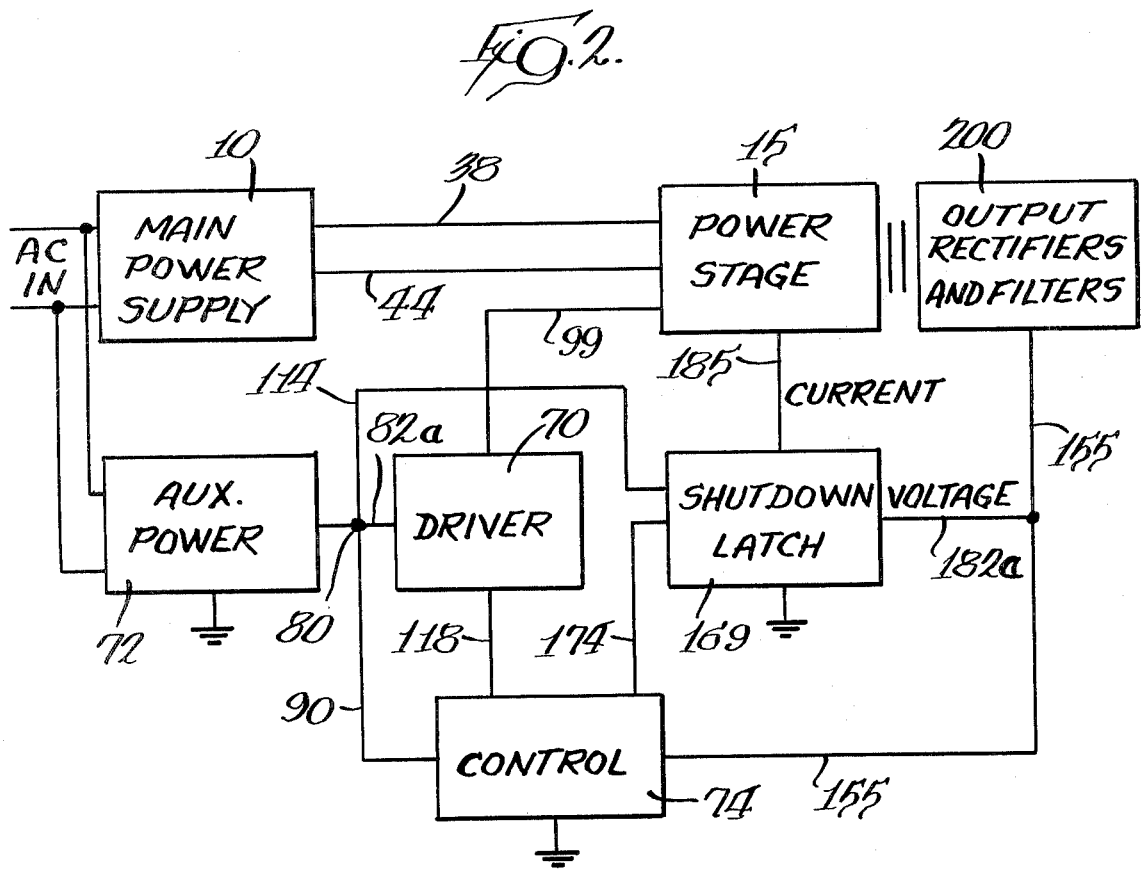
FIG. 2 is a block diagram thereof.

Referring to FIGS. 1 and 2, the illustrative circuit consists first of a main power supply 10 whose purpose it is to rectify and filter AC line current and deliver the derived direct current to the primary winding 12 of the power transformer 14 in the power stage 15. To this end, the two 60 Hz 120 volt lines 16 and 18 are connected, one line through a fuse 20 and a main switch 22, to opposite sides of an input choke 24 and thence to terminals 26 and 28 respectively. A capacitor 30 spans the line between terminals 26 and 28, and serves, with the input choke 24, to filter out radio frequency interference from the incoming current and reduce line conducted interference.

Terminal 26 is connected through resistor 32 to one input terminal of a full wave diode bridge rectifier 34 and terminal 28 to the other input terminal thereof. Output terminal 36 of the rectifier 34 is connected by line 38 through fuse 40 to deliver positive current to the primary 12 of the power transformer 14. The other output terminal 42 of the rectifier is connected through line 44 and terminal 46 to terminal 48. Terminal 48 is connected to the other end of the primary winding through resistor 50, terminal 52 and the emitter and collector of switching transistor 54. Thus a DC circuit is established through the primary 12 of transformer 14 which is adapted to be periodically closed and opened by the transistor 54.

Resistor 56 and capacitor 58 are connected in parallel across lines 38 and 44. Capacitor 58 is a filter capacitor to filter the output of the full wave rectifier and resistor 56 is a bleeder resistor to discharge capacitor 58.

B. Power Stage

The primary 12 of the power transformer 14 and the circuitry including the emitter and collector of transistor 54 may be considered to be the power stage 15 identified in the block diagram of FIG. 2. In addition to these elements, a dv/dt network consisting of the parallel-connected diode 62 and resistor 64 in series with capacitor 66 is connected to terminal 46 in line 44 at one end and between the collector of transistor 54 and the primary winding 12 at the other. The purpose of this network is to limit the peaking of the voltage rise in the transformer primary when the switching transistor 54 turns off to protect the switching transistor from secondary breakdown.

C. Auxiliary Power Supply

The base drive of transistor 54 is derived from a driver section 70 which is powered by an auxiliary power supply 72 and controlled by a control section 74. In the auxiliary power supply 72, the primary of a step down transformer 76 is connected to terminals 26 and 28 in the main power supply in parallel with the full wave rectifier 34 thereof. The secondary of the transformer 76 is connected to the input terminals of a full wave diode bridge rectifier 78. The positive output terminal is connected to terminal 80 and the negative output terminal is connected to ground. A capacitor 82 connected across the output terminals filters the output of the rectifier. The DC output of the auxiliary power supply is approximately 15 volts.

D. Driver

The driver section 70 basically applies or removes base drive from the main switching transistor 54, and acts essentially as an amplifier for the ON and OFF signals derived from the control section 74. Terminal 80 is connected by line 82a to a center tap 84 of the primary 86 of a driver transformer 88. Terminal 80 is also connected by line 90 to the control section of the circuit for powering the various elements therein.

One end of the primary of transformer 88 is connected to the collector of a driver transistor 92, the emitter of which is connected to ground. The other end of the primary (on the other side of tap 84) is connected through diode 93 to ground. A peak suppression circuit including resistor 94 and capacitor 96 is connected between lead 82a and the collector of transistor 92 in parallel with the collector circuit half of the transformer primary winding to suppress voltage peaks derived from leakage flux in the core of the transformer 88.

The secondary 98 of transformer 88 is in the base-emitter circuit of the switching transistor 54. One end of the secondary is connected by lead 99 to the base of the transistor 54 through the parallel-arranged resistor 100 and diode 102. The emitter is connected to the other end of the secondary by lead 103 through terminal 104. A resistor 106 is connected across the base-emitter junction in parallel with the transformer secondary 98.

The operation of the driver section is as follows. Base drive applied to transistor 92 will turn it on so closing a conductive path from terminal 80 through the half of the transformer primary between the tap 84 and the transistor 92 collector and the transistor to ground. Voltage is thus induced in the secondary of the transformer to apply a positive voltage of about 5 volts to the base of switching transistor 54 through current limiting resistor 100 to turn transistor 54 on. When current is interrupted to the primary of transformer 88 by removal of base drive from transistor 92, the collapse of the flux field in the core of transformer 88 generates a reverse voltage in both the primary 86 and secondary 98 of the transformer. In the secondary, the voltage swings from a positive to a negative value to put a negative voltage on the base of transistor 54 which immediately removes stored carriers in the base region of transistor 54 through diode 102 and results in rapid turn-off. The other half of the primary between tap 84 and diode 93 serves to absorb some of the energy of the collapsing flux field of the core to protect against reverse overvoltages being applied to transistor 92.

Resistor 106 connected in parallel across the base-emitter junction of transistor 54 serves to reduce the input impedance of the base junction for a more uniform input thereto. Resistor 50 is a current sensing resistor to sense current through the switching transistor 54 and actuate the shut down circuit if this current becomes excessive, as will be later described.

E. Control Circuit

The control section 74 of the circuit incorporates two integrated circuits; a timer commercially identified as #555 and wired to perform as a constant-OFF, variable-ON time oscillator and a voltage regulator commercially identified as #723 and wired to perform as a voltage reference, comparator, and error amplifier.

The signal to the base of the driver transistor 92 is derived from IC 555. Terminal 8 of the IC is connected to power from terminal 80, through line 90, terminal 110, terminal 112, and line 114. Terminal 1 of the IC is connected to the ground line 116. Terminal 3 is the output terminal which is connected through line 118 and the parallel-connected limiting resistor 120 and diode 122 to the base of transistor 92.

Terminals 2, 6 and 7 are all concerned with the establishment of the basic rate and nature of the oscillatory output of the IC. Terminal 7 is connected to terminal 124 and from thence through resistor 126 to the power output terminal 112. Terminal 124 is also connected through a parallel-arranged diode 128 and resistor 130 to terminal 132. Terminal 132 is also connected to terminals 2 and 6 and, through capacitor 134 to the ground line 116.

Resistor 126 determines the maximum ON time of the output. Resistor 130 determines the OFF time. Diode 128 permits the independent substitution of the resistors 126 and 130 for different time intervals without affecting the other value. Capacitor 134 cooperates with resistors 130 and 126 determine the basic frequency of operation.

Terminal 4 is a DISABLE control which, upon grounding, turns the oscillator off. Terminal 5 modifies the ON time of the oscillatory discharge in accordance with the voltage on the line connected to it. Terminal 5 is connected through line 136, diode 138, terminal 139 and line 140 to pin 10 to the 723 IC. Terminal 139 is connected to ground through resistor 141.

IC 723 is connected to receive power from power terminal 110 through line 142 to terminals 11 and 12 and is connected to ground from terminal 7. Terminal 10, as stated, is the output terminal from which the voltage on terminal 5 of IC 55 is controlled through lines 140 and 136. Non-inverting input terminal 5 is connected through resistor 144 to ground. Reference voltage terminal 6 is connected to ground through resistors 144 and 146. Terminal 6 carries a reference voltage of about 7 volts on it. The reference voltage is reduced by half by the voltage divider consisting of the resistors 144 and 146 and applied to the non-inverting input 5. The inverting input terminal 4, is connected through a terminal 148 to the wiper of an adjustable resistor 150. Terminal 148 is also connected through a capacitor 152 to pin 13 as a frequency compensating component for stability. Resistor 150 together with resistors 153 and 154 comprise a voltage divider connected by line 155 between terminal 156 in the output of the flyback secondary winding 157 of the power transformer 14, to be later described, and the ground line 116.

To illustrate the interrelation of the two ICs, the power input to the 555 IC is +15 volts. The open circuit voltage on pin 5 of that IC is +10 volts in reference to ground. However, assuming a zero output in line 140, the current drain through resistor 141 will drop the potential to about +3 volts and produce a minimum ON time in the 555 IC output pulses. IC 723 compares the input at terminal 4 with the reference voltage and amplifies the error to vary the output voltage on either side of the approximately 7 volt normal output at terminal 10. The output of the 723 IC will run generally between +3 volts to upward of +10 volts. Over-voltage at terminal 156 in the flyback secondary produces a low voltage at pin 10; under-voltage in the secondary produces a higher voltage. When the output of the 723 IC is added to the output of the 555 IC at terminal 139, the current drain on terminal 5 of the 555 IC will diminish and therefore cause the voltage on that terminal to rise, so lengthening the ON time of the pulses. Since the 555 IC operates in a variable ON, constant OFF time mode, the frequency will vary. A norm is established at about 20 KHz when the voltage at terminal 156 is precisely that desired. The frequency will wander from the norm about 2 KHz on either side as greater or less ON time is signalled.

Diode 138, of course, prevents over-voltage on pin 10 of IC 723 from being applied to pin 5 of IC 555. Resistor 141, in addition to providing the reference for the voltage drop to ground, also provides a current drain for an internal transistor in IC 723, of which pin 10 is the emitter.

Line 136 is also connected to ground 116 through a soft start circuit consisting of diode 160, terminal 162, and capacitor 164. Terminal 162 is connected through a high value resistor 166 to the power line 114. When the circuit is first switched on, current flow to the capacitor 164 immediately pulls the voltage on pin 5 down to its minimum value for minimum ON time. As the capacitor charges, the current drain on pin 5 drops and the voltage thereon rises until it comes under the control of the voltage on pin 10 of IC 723. The soft start circuit thus simulates momentarily an over voltage condition in the secondary. Resistor 166 slowly charges the capacitor 164 to 15 volts so as to impose a positive reverse bias on diode 160 and also provides a discharge path for capacitor 164 when the circuit is switched off.

As to the output of IC 555 from terminal 3 through line 118 to the base of transistor 92, resistor 120 serves to limit the base current, and diode 122 permits an immediate discharge of the base region of the transistor when IC 555 goes to OFF to enable an immediate turn-off of the transistor.

F. Shut Down Latch

A shut down latch 169 is provided to disable IC 555 in the event of over-current in the power transformer primary circuit or over-voltage in the secondary. Auxiliary power is also delivered from terminal 112 through line 114 and resistor 170 to the emitter of a transistor 172. The base of transistor 172 is connected to line 174 which is connected at one end to the DISABLE terminal 4 of IC 555 and at its other end to the collector terminal 5 of the phototransistor 173 of an optical coupler 175. A capacitor 176 spans the auxiliary power supply line 114 and line 174. The collector of transistor 172 is connected through line 178 and terminal 177 to the base of the phototransistor 173, pin 6 of the optical coupler 175. The emitter of the phototransistor 173 is connected to ground. The anode of the LED 179 of the optical coupler, pin 1, is connected through resistor 182 and diode 184 to terminal 104 in the base-emitter circuit of the switching transistor 54. Then cathode of the LED 179, pin 2, is connected by line 185 to terminal 48. The base, pin 6, of the phototransistor 173 is also connected from terminal 177 through line 182a, terminal 184a and resistor 186 to terminal 188 in line 155 connected to terminal 156 in the flyback output. Terminal 184a is connected to the ground line 116 through resistor 190. A capacitor 192 is likewise connected between ground and line 182a.

The combination of the transistor 172 and the optical coupler 175 form a regenerative latch which, once conducting and thereby closing a conductive path from the DISABLE pin 4 of IC 555 to ground, continues conducting until the circuit as a whole is switched off. When power is removed, the latch resets. Normally transistor 172 and the phototransistor are non-conductive.

The latch is energized in either of two ways. Current flow through the switching transistor 54 produces a voltage drop across the resistor 50. The circuit to the LED of the optical coupler 174 is completed through terminal 52, terminal 104, diode 184 which serves to reduce the voltage applied to the LED, and current limiting resistor 182. Under normal operating circumstances, the current through the LED is insufficient to cause it to light up. When, however, there is an overcurrent situation through the switching transistor 54, such as might arise when there is a short circuit in one of the forward transfer secondary circuits, the voltage drop across resistor 50 increases sufficiently to cause the LED to light. This makes the phototransistor 173 of the optical coupler conductive and permits current flow from pin 4 of IC 555 through line 174 to the collector of the phototransistor and to ground through the emitter thereof. With current flow through line 174, forward bias is applied to the base of transistor 172 which in turn forwardly biases the base of the phototransistor in its conductive condition. The grounding of pin 4, of course, disables IC 555.

The other way in which the latch can be triggered is by the detection of an over-voltage condition in the flyback secondary. This situation might arise where there is an open circuit in that secondary or in the microprocessor which it powers or a malfunctioning in either of the ICs 723 or 555. In the normal situation of voltage detection with respect to the latch, the voltage at terminal 156 is reduced to about a twentieth of its value at terminal 184 by the voltage divider consisting of the resistors 186 and 190. This reduced voltage is applied through line 182 to the base, pin 6, of the phototransistor 173. This voltage is insufficient under normal conditions to forwardly bias the phototransistor. With a rise in the voltage, however, the bias on the base of the phototransistor increases to apply forward bias to it, and the regenerative latch established with transistor 172, grounds pin 4 of IC 555 as discussed above. The capacitor 192 bridging line 182 and the ground line 116 serves to filter out transients which might otherwise trigger the latch.

G. The Power Outputs

In the output section 200 there are four secondary windings on the power transformer 14. Winding 202 and 204 share a common ground line 206. Both of these windings are connected in the forward transfer mode. Winding 208 is connected in the flyback mode. Winding 210 is a low voltage AC supply for the lamps of the pinball machine which remain continuously on. Since the current induced in the secondary 210 is essentially a square wave, a radio frequency choke coil 212 is provided in the circuit to reduce radio frequency interference from the output. This secondary circuit is fused as at 214 to protect against short circuits. The AC output is about 7 volts up to 6 amps.

Secondary coil 202 is connected on that end opposite to ground through diode 216, terminal 217 and resistor 218 to output terminal 220. Diode 216 is oriented to pass current and deliver power to the output terminal 220 when the flux field in the transformer core is that generated by current flow through the primary. Resistor 218 limits current surges. A capacitor 222 is connected between the output terminal 220 and ground to filter the square wave DC input to the terminal 220. This circuit provides a 24 volt unregulated output for the operation of solenoids in the pinball machine.

Secondary winding 202 also powers a regulated output to terminal 224. A line 226 is connected to terminal 217 to receive the pulse train output of secondary winding 202 and is connected through an isolating diode 228 to the input of a linear voltage regulator (78L12) 230. The voltage regulator provides a low current regulated 12 volt output at the output terminal 224. A capacitor 232 is connected between the output line and ground ahead of the voltage regulator 230 to filter the input to the voltage regulator. The diode 228 insures that the whole of the output of the capacitor 232, when discharging, goes through the voltage regulator 230 and does not discharge to terminal 220 when the solenoid current drain draws the secondary voltage down. A second capacitor 234 is connected between the output of the voltage regulator 230 and ground to stabilize the operation of the voltage regulator which otherwise might have a tendency to go into oscillation. The voltage regulator 230 demands a ground connection 236.

Since this regulated circuit also receives its power from the secondary winding 202 through the diode 216, it likewise will be operating in the forward transfer mode. The output of this circuit is employed to provide a reference voltage to the microprocessor. The current output is too small for a power source.

Output terminal 240 is a pulse averaged or filtered pulse train, 18 volt output, again operating in the forward conversion mode. Diode 242 couples the proper polarity pulse into a low pass filter consisting of inductor 244 and capacitor 246 which remove all but the DC component of the pulse input. Diode 248 is a recovery diode allowing inductor 244 current to flow when diode 242 is reversed biased. This circuit powers the multiplexed lights in the machine, those lights which are temporarily on in various combinations.

The circuit incorporating secondary winding 208 operates in the flyback mode. This circuit powers the microprocessor and must provide appreciable tightly regulated power. Consequently, it is this circuit which includes terminal 156 which samples the voltage for the voltage reference and error amplifier IC 723 and which also is connected to the shut down latch.

That end of the secondary winding which goes positive when the primary of transformer 14 is conducting is connected to ground line 250 and the other end of the secondary is connected by line 252 through diode 254, terminal 156, inductor 256 and terminal 258 to output terminal 260. Terminal 258 is also connected through diode 262 to output terminal 264.

Diode 254 is oriented to be reverse biased with respect to current in the secondary winding 208 incident to current flow through the primary and be forward biased with respect to current in the secondary incident to a cessation of current in the primary. Thus, energy stored in the transformer during current flow in the primary in the form of a flux field generates current in the secondary when current flow in the primary ceases. Capacitors 266 and 268 connected between line 252 and ground line 250, capacitor 266 is an energy storage device to provide energy to the load during forward transfer. Capacitor 268 and inductor 256 constitute a low pass filter. The output terminal 260 produces 6 volts and is connected in the pinball machine for the operation of the scoring lights.

Diode 262 leading from terminal 258 to the output terminal 264 serves to drop the voltage at terminal 258 from 6 volts to 5 volts. Terminal 264 is connected for the operation of the microprocessor.

Figure 3:
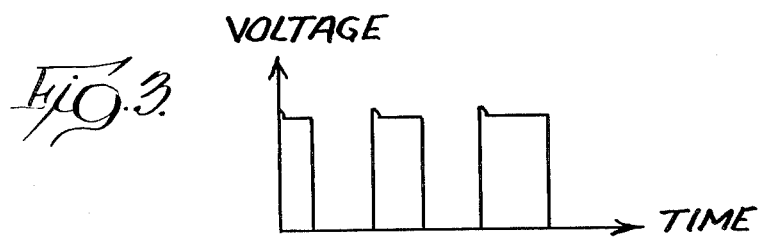
FIG. 3 is a voltage curve across the power transformer primary.
Figure 4:
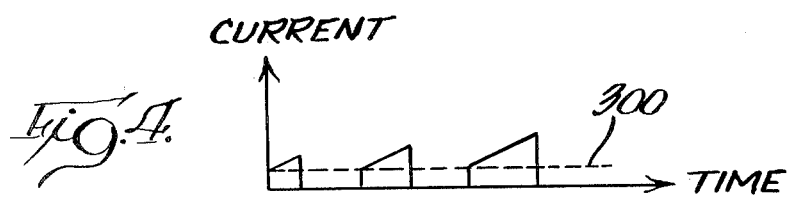
FIG. 4 is the corresponding current curve through the main switching transistor.

FIGS. 3 and 4 illustrate respectively the voltage and current curves across the main switching transistor 54. It reflects an under-voltage situation in the flyback secondary. Thus the voltage ON pulses are increasing in duration. In the current curve, it will be noted that the current rises immediately to a level 300 reflecting the power demand of the forward transfer circuits. From this initial level the current ramps up at a rate determined by the impressed voltage reflecting the development of flux or the storage of energy in the core. The level to which the current rises above the forward transfer line 300 is determined by the duration of the pulse and is generally proportional to the stored energy available to the flyback circuit. The straight line ramp is generally correct. The pulse duration, on the order of $2 \times 10^{-5}$ seconds, stops flux development well short of saturation. The level of the forward transfer line 300 will vary considerably as, for instance, solenoids cut in or drop out.

It was mentioned above that this invention will find utility outside the area of pinball machines. One such instance is a thermal printer. This device involves the consecutive energization of a varying number of heating elements. The power demand, thus, is variable but close regulation is not a necessity. There is some latitude in the degree of heating. The selection of the heating elements, however, is controlled by digital circuitry requiring a relatively low but tightly regulated power supply free from transients.

It will be understood that an embodiment only has been described here. Alternatives and variations will undoubtedly suggest themselves to those skilled in the art. Thus, this invention should be regarded as being limited only as set forth in the following claims.

I claim:

1. A regulated switching mode power supply comprising a power transformer having a primary winding, a core, and forward transfer and flyback secondary windings, a DC source in series with said primary winding, means for periodically interrupting current flow through said primary winding, said forward transfer secondary winding having a diode in series therewith to permit current flow only in that direction induced by the rise of current in said primary winding and said flyback secondary winding having a diode in series therewith to permit current flow only in that direction induced by a stopping of current in said primary winding, feedback means in circuit with said flyback winding and being operable to effect pulse width modulation of said interrupting means in order to regulate the voltage on said flyback winding and averaging filter means in circuit with said forward transfer winding, whereby the power supply is operable to provide regulated forward transfer and flyback voltage outputs.

2. The combination as set forth in claim 1 wherein said interrupting means comprises an electronic switch and an oscillator controlling the opening and closing of said switch.

3. The power supply of claim 1 wherein said feedback means is an error amplifier.

4. The power supply of claim 1 wherein said averaging filter means is a low pass filter comprising an inductor and a capacitor.

5. In a switching mode power supply having a power transformer including a primary winding and a secondary winding, a DC source connected to the primary of said transformer, an electronic switch in series with said primary winding, an oscillator for operating said switch, said oscillator having a disabling terminal to disable said oscillator upon the application of a voltage level thereto, and a source of said voltage level; a shutdown latch comprising a phototransistor connected between said terminal and said source, an LED coupled in an optical coupler relationship to said phototransistor, said LED being connected to sample current through said primary winding and be activated by current in excess of a pre-established level to make said phototransistor conductive, and means responsive to the conductive condition of said phototransistor to provide forward bias to the base of said phototransistor to maintain the closed circuit between said terminal and said source.

6. The combination as set forth in claim 5 wherein said responsive means comprises a second transistor connected between a source of power and the base of said phototransistor, the base of said second transistor being connected to said terminal, the application of said voltage level thereto forwardly biasing said second transistor.

7. The combination as set forth in claim 5 wherein said voltage level is ground.

8. In a switching mode power supply having a power transformer including a primary winding and a secondary winding, circuit means for connecting said secondary winding to a load, a DC source connected to the primary of said transformer, an electronic switch in series with said primary winding, an oscillator for operating said switch, said oscillator having a disabling terminal to disable said oscillator upon the application of a voltage level thereto, and a source of said voltage level; a shutdown latch comprising a transistor connected between said terminal and said source, circuit means sampling the voltage level in said secondary winding connected to the base of said transistor to render said transistor conductive upon voltage in excess of a pre-established level in said secondary winding, and means responsive to the conductive condition of said transistor to provide forward bias to the base of said transistor to maintain the closed circuit between said terminal and said source.

9. The combination as set forth in claim 8 wherein said responsive means comprises a second transistor connected between a source of power and the base of said first transistor, the base of said second transistor being connected to said terminal, the application of said voltage level to said base of said second transistor rendering said second transistor conductive.

10. The combination as set forth in claim 8 wherein said voltage level is ground.

11. The combination as set forth in claim 8 including a diode in series with said secondary winding to cause said secondary winding to operate only in the flyback mode.

12. In a switching mode power supply comprising a power transformer having a primary winding and a secondary winding for the delivery of power to a load, a DC source and a switching transistor in series with said primary winding, and an oscillator connected to turn said transistor cyclically off and on, said oscillator having a disabling terminal to disable said oscillator upon the application of a voltage level thereto, and a source of said voltage level; a shutdown latch comprising a phototransistor connected between said terminal and said source, an LED coupled in an optical coupler relationship to said phototransistor, said LED being connected to sample current through said primary winding and be activated by current in excess of a pre-established level to make said phototransistor conductive, circuit means sampling the voltage level in said secondary winding connected to the base of said phototransistor to render said transistor conductive in the event of a voltage in excess of a pre-established level in said secondary winding, and means responsive to the conductive condition of said phototransistor to provide forward bias to the base of said phototransistor to maintain the closed circuit between said terminal and said source.

13. The combination as set forth in claim 12 wherein said responsive means comprises a second transistor connected between a source of power and the base of said phototransistor, the base of said second transistor being connected to said terminal, the application of said voltage level to said base of said second transistor rendering said second transistor conductive.

14. The combination as set forth in claim 12 wherein said voltage level is ground.

15. The combination as set forth in claim 12 including a diode in series with said secondary winding to cause said secondary winding to operate only in the flyback mode.

* * * * *

UNITED STATES PATENT AND TRADEMARK OFFICE
CERTIFICATE OF CORRECTION

PATENT NO. : 4,209,826
DATED : June 24, 1980
INVENTOR(S) : Robert A. Priegnitz

It is certified that error appears in the above—identified patent and that said Letters Patent is hereby corrected as shown below:

Column 5, line 15, "to the 723" should read -- of the 723 --

Column 6, line 41, "Then cathode" should read -- The cathode --.

Signed and Sealed this

Sixteenth Day of September 1980

[SEAL]

Attest:

SIDNEY A. DIAMOND

Attesting Officer

Commissioner of Patents and Trademarks